(12) United States Patent
Masuda et al.

(10) Patent No.: US 10,067,524 B2
(45) Date of Patent: Sep. 4, 2018

(54) MANAGEMENT DEVICE, MANAGEMENT SYSTEM, AND PROGRAM

(71) Applicant: PANASONIC INTELLECTUAL PROPERTY MANAGEMENT CO., LTD., Osaka (JP)

(72) Inventors: Rikiya Masuda, Osaka (JP); Kiyotaka Takehara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 197 days.

(21) Appl. No.: 14/418,925

(22) PCT Filed: Jul. 2, 2013

(86) PCT No.: PCT/JP2013/004108
§ 371 (c)(1),
(2) Date: Jan. 30, 2015

(87) PCT Pub. No.: WO2014/020825
PCT Pub. Date: Feb. 6, 2014

(65) Prior Publication Data
US 2015/0177764 A1    Jun. 25, 2015

(30) Foreign Application Priority Data

Jul. 31, 2012 (JP) ................ 2012-170360

(51) Int. Cl.
*G05F 1/66* (2006.01)
*G06Q 50/06* (2012.01)
(Continued)

(52) U.S. Cl.
CPC .............. *G05F 1/66* (2013.01); *G06Q 50/00* (2013.01); *G06Q 50/06* (2013.01); *H02J 3/32* (2013.01);
(Continued)

(58) Field of Classification Search
CPC .......... G05F 1/66; G06Q 50/00; G06Q 50/06; H02J 3/32; H02J 3/383; H02J 7/35;
(Continued)

(56) References Cited

U.S. PATENT DOCUMENTS 8,176,095 B2 * 5/2012 Murray ................. G06Q 10/10
705/14.2
2003/0158631 A1    8/2003 Masuda et al.
(Continued)

FOREIGN PATENT DOCUMENTS

CN      201017443 Y    2/2008
JP      2001-056804 A  2/2001
(Continued)

OTHER PUBLICATIONS

Machine translation of EP 1729223.*
(Continued)

*Primary Examiner* — Thomas C Lee
*Assistant Examiner* — Tri T Nguyen
(74) *Attorney, Agent, or Firm* — McDermott Will & Emery LLP

(57) ABSTRACT

In a management device, a state determination table in a first storage portion indicates correspondence relationships in which target achievement levels are respectively associated with combinations with division periods and ranges of amount of power. An action table in a second storage portion indicates correspondence relationships with operations for making an execution portion perform and the target achievement levels. A first extraction portion extracts, from the state determination table, a target achievement level corresponding to a combination with a division period including a date acquired by a date acquisition portion and a range of amount of power including the amount of consumed power acquired by a power acquisition portion. A second extraction portion (Continued)

| TIME POINT / AMOUNT OF CONSUMED POWER (kWh) | FIRST TO TENTH | ELEVENTH TO TWENTIETH | TWENTY-FIRST TO THIRTIETH |
|---|---|---|---|
| 0~40 | L 2 | L 1 | L 1 |
| 40~80 | L 3 | L 2 | L 1 |
| 80~120 | L 4 | L 3 | L 2 | extracts, from the action table, an operation corresponding to the target achievement level extracted by the first extraction portion. An execution control portion controls the execution portion to perform the operation extracted by the second extraction portion.

15 Claims, 9 Drawing Sheets

(51) Int. Cl.
*G06Q 50/00* (2012.01)
*H02J 3/32* (2006.01)
*H02J 3/38* (2006.01)
*H02J 7/35* (2006.01)
*H02J 13/00* (2006.01)

(52) U.S. Cl.
CPC ............... *H02J 3/383* (2013.01); *H02J 7/35* (2013.01); *H02J 13/001* (2013.01); *Y02E 10/563* (2013.01); *Y02E 10/566* (2013.01); *Y02E 40/72* (2013.01); *Y02E 60/722* (2013.01); *Y04S 10/123* (2013.01); *Y04S 10/14* (2013.01); *Y04S 10/40* (2013.01); *Y04S 10/60* (2013.01)

(58) Field of Classification Search
CPC .... H02J 13/001; Y02E 10/563; Y02E 10/566; Y02E 40/72; Y02E 60/722; Y04S 10/123; Y04S 10/14; Y04S 10/40; Y04S 10/60
See application file for complete search history.

(56) References Cited

U.S. PATENT DOCUMENTS

| | | | | |
|---|---|---|---|---|
| 2010/0275047 | A1* | 10/2010 | Kaneko | G06F 1/3203 713/323 |
| 2011/0022242 | A1* | 1/2011 | Bukhin | G06Q 10/06 700/291 |
| 2012/0329424 | A1* | 12/2012 | Gudlavenkatasiva | H04L 12/1421 455/406 |

FOREIGN PATENT DOCUMENTS

| | | |
|---|---|---|
| JP | 2001-327076 A | 11/2001 |
| JP | 2005-080403 A | 3/2005 |
| JP | 2005-266873 A | 9/2005 |
| JP | 2007-318907 A | 12/2007 |
| JP | 2008-043022 A | 2/2008 |
| JP | 2010-211780 A | 9/2010 |
| JP | 2010-223628 A | 10/2010 |
| JP | 2010-271915 A | 12/2010 |
| JP | 2011-197797 A | 10/2011 |
| JP | 2011-210097 A | 10/2011 |
| JP | 2011-242046 A | 12/2011 |

OTHER PUBLICATIONS

International Search Report issued in International Application No. PCT/JP2013/004108 with Date of mailing, with English Translation.

\* cited by examiner

FIG. 2

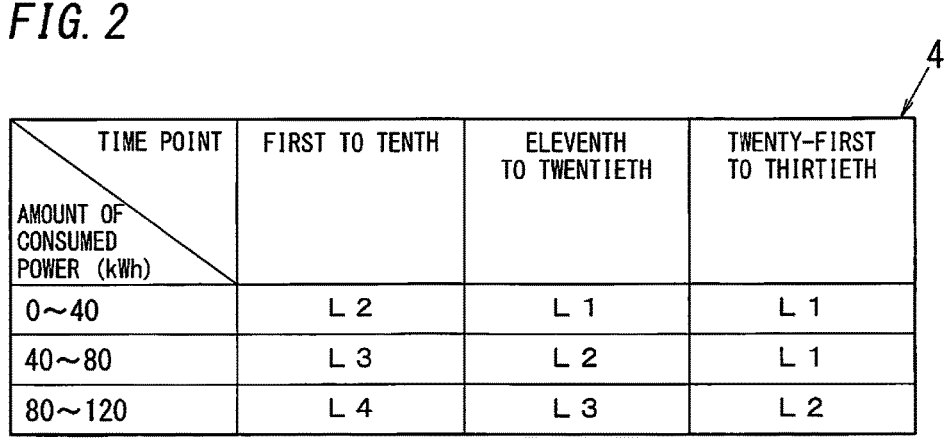

| AMOUNT OF CONSUMED POWER (kWh) \ TIME POINT | FIRST TO TENTH | ELEVENTH TO TWENTIETH | TWENTY-FIRST TO THIRTIETH |
|---|---|---|---|
| 0~40 | L 2 | L 1 | L 1 |
| 40~80 | L 3 | L 2 | L 1 |
| 80~120 | L 4 | L 3 | L 2 |

FIG. 3

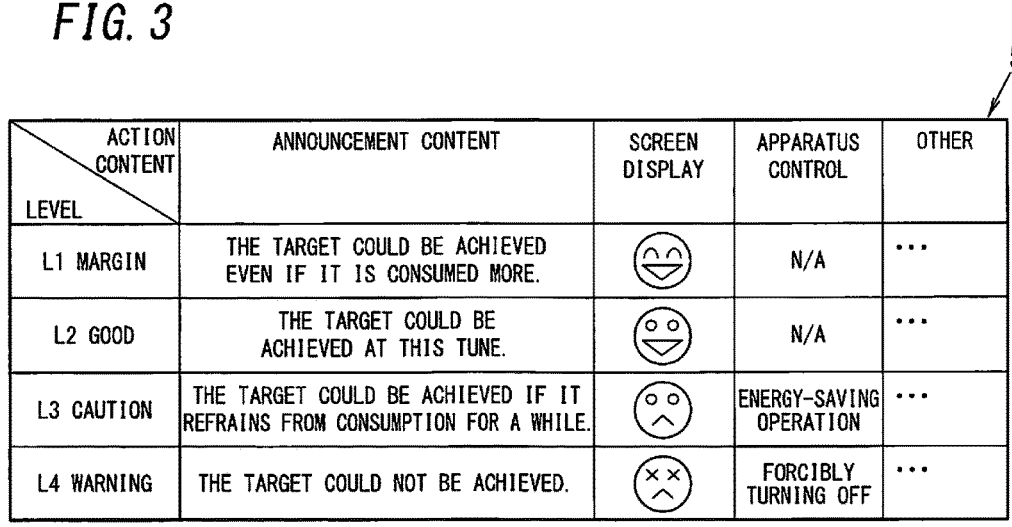

| LEVEL \ ACTION CONTENT | ANNOUNCEMENT CONTENT | SCREEN DISPLAY | APPARATUS CONTROL | OTHER |
|---|---|---|---|---|
| L1 MARGIN | THE TARGET COULD BE ACHIEVED EVEN IF IT IS CONSUMED MORE. | 😄 | N/A | ... |
| L2 GOOD | THE TARGET COULD BE ACHIEVED AT THIS TUNE. | 🙂 | N/A | ... |
| L3 CAUTION | THE TARGET COULD BE ACHIEVED IF IT REFRAINS FROM CONSUMPTION FOR A WHILE. | 😟 | ENERGY-SAVING OPERATION | ... |
| L4 WARNING | THE TARGET COULD NOT BE ACHIEVED. | 😵 | FORCIBLY TURNING OFF | ... |

FIG. 9A

| AMOUNT OF CONSUMED POWER (SPRING) | | | TENTH | TWENTIETH | THIRTIETH |
|---|---|---|---|---|---|
| MONTH | TARGET ACHIEVEMENT | TARGET VALUE | | | |
| MARCH | Y | 100kWh | 25kWh | 55kWh | 80kWh |
| APRIL | N | 100kWh | 40kWh | 85kWh | 125kWh |
| MAY | N | 100kWh | 45kWh | 90kWh | 110kWh |

FIG. 9B

| AMOUNT OF CONSUMED POWER (SUMMER) | | | TENTH | TWENTIETH | THIRTIETH |
|---|---|---|---|---|---|
| MONTH | TARGET ACHIEVEMENT | TARGET VALUE | | | |
| JUNE | Y | 300kWh | 75kWh | 125kWh | 280kWh |
| JULY | Y | 300kWh | 80kWh | 140kWh | 270kWh |
| AUGUST | Y | 300kWh | 95kWh | 155kWh | 280kWh |

FIG. 9C

| AMOUNT OF CONSUMED POWER (AUTUMN) | | | TENTH | TWENTIETH | THIRTIETH |
|---|---|---|---|---|---|
| MONTH | TARGET ACHIEVEMENT | TARGET VALUE | | | |
| SEPTEMBER | Y | 120kWh | 25kWh | 55kWh | 80kWh |
| OCTOBER | Y | 120kWh | 20kWh | 40kWh | 70kWh |
| NOVEMBER | N | 120kWh | 25kWh | 55kWh | 125kWh |

FIG. 9D

| AMOUNT OF CONSUMED POWER (WINTER) | | | TENTH | TWENTIETH | THIRTIETH |
|---|---|---|---|---|---|
| MONTH | TARGET ACHIEVEMENT | TARGET VALUE | | | |
| DECEMBER | N | 300kWh | 75kWh | 125kWh | 310kWh |
| JANUARY | Y | 300kWh | 80kWh | 140kWh | 270kWh |
| FEBRUARY | Y | 300kWh | 95kWh | 155kWh | 280kWh |

MANAGEMENT DEVICE, MANAGEMENT SYSTEM, AND PROGRAM

RELATED APPLICATIONS

This application is a national phase of International Application No. PCT/JP2013/004108, filed on Jul. 2, 2013, which in turn claims the benefit of Japanese Application No. 2012-170360, filed on Jul. 31, 2012 the disclosures of which Applications are incorporated by reference herein.

TECHNICAL FIELD

The present invention relates to: a management device that is configured to manage power consumption by a load; a management system; and a program.

BACKGROUND ART

Conventionally, there has been known, as a management device that is configured to manage power consumption by a load, a device that is configured to display the amount of consumed power from the start time of an object period to the present time (a prescribed time point within the object period) and a target value of the amount of power to be consumed in the object period.

However, as shown in FIG. 11, the above-mentioned device only displays the amount of consumed power and the target value on a single display screen. For this reason, a user needs to see the display screen displaying the amount of consumed power and the target value, and confirm whether or not the amount of consumed power is over the target value, and be conscious of how much daily power consumption should be suppressed in order to achieve a target. That is, since the above-mentioned device entrusts to the user all of energy-saving operations of achieving the target, there is a problem that the operations of the above-mentioned device are not directly linked with practice of energy-saving activities.

As a means of solving the above-mentioned problem, there has been known a device that is configured to determine an energy-saving technique (described later) based on a target achievement level, which indicates the rate of the amount of consumed power to a target value (for example, JP 2011-197797 A, hereinafter referred to as a "document 1").

The device described in the document 1 is configured to calculate the target achievement level based on the target value and the amount of consumed power that are measured by a power measuring portion, and then determine the energy-saving technique based on this target achievement level. Here, the energy-saving technique has at least one of an apparatus control to an apparatus and information notification to a user.

However, the conventional device described in the document 1 is configured to determine the energy-saving technique based on the target achievement level under the same standard at all of time points in an object period. For this reason, the device described in the document 1 has a problem that processing suitable for each time point in the object period could not be performed towards the target achievement.

For example, in the case where the amount of consumed power approaches the target value, in a time period close to the end of the object period, the target can be achieved only by changing a little the operation of the apparatus so that the energy-saving is performed. On the other hand, in the initial period of the object period, the target cannot be achieved if the operation of the apparatus is made not to stop. However, since determining the energy-saving technique under the same standard in the initial period and the time period close to the end of the object period, the device described in the document 1 controls to reduce the future amount of power to be consumed more than necessary in the time period close to the end of the object period, and then raises a user's dissatisfaction. On the other hand, in the initial period of the object period, the device cannot reduce the future amount of power to be consumed sufficiently, and then cannot achieve the target.

SUMMARY OF INVENTION

The present invention has been made in view of the above-described problems, and an object of the present invention is to provide a management device, a management system, and a program, which can perform a processing suitable for each time point in an object period so that the amount of power to be consumed in the object period becomes equal to or less than a target value.

A management device according to the present invention includes a power acquisition portion, a date acquisition portion, a first storage portion, a second storage portion, a first extraction portion, a second extraction portion, and an execution control portion. The power acquisition portion is configured to acquire an amount of consumed power by a load from a start time of an object period to a prescribed time point within the object period. The date acquisition portion is configured to acquire a date of the prescribed time point. The first storage portion is configured to store a state determination table. The state determination table indicates correspondence relationships in which target achievement levels indicating a possibility of target achievements are respectively associated with combinations with a plurality of division periods and a plurality of ranges of amount of power. The plurality of division periods are in the object period. The plurality of ranges of amount of power are in a range of amount of power equal to or less than a target value of the amount of power to be consumed in the object period. The second storage portion is configured to store an action table. The action table indicates correspondence relationships with operations for making an execution portion perform and the target achievement levels. The first extraction portion is configured to extract, from the state determination table, a target achievement level corresponding to a combination with a division period including the date acquired by the date acquisition portion and a range of amount of power including the amount of consumed power acquired by the power acquisition portion. The second extraction portion is configured to extract, from the action table, an operation corresponding to the target achievement level extracted by the first extraction portion. The execution control portion is configured to control the execution portion to perform the operation extracted by the second extraction portion.

Preferably, the management device further includes a history information storage portion and a division changing portion. The history information storage portion is configured to store history information in which a past object period is associated with an amount of consumed power in the past object period. The division changing portion is configured to changes the plurality of division periods and the plurality of ranges of amount of power in the state determination table according to the history information stored by the history information storage portion.

In the management device, the execution portion is preferably a reporting portion configured to perform external reporting. The operation preferably includes reporting, by the reporting portion, a content according to the target achievement level of the prescribed time point.

Preferably, the management device further includes an operation content acquisition portion and an operation content changing portion. The operation content acquisition portion is configured to acquire a content of at least one of the operations from an input device configured to receive an input of the at least one of the content of the operations. The operation content changing portion is configured to change the at least one of the operations in the action table stored by the second storage portion to the content acquired by the operation content acquisition portion.

A management system according to the present invention includes the management device and a measuring portion. The measuring portion is configured to measure the amount of consumed power from the start time of the object period to the prescribed time point within the object period.

A program according to the present invention causes a computer to function as a power acquisition portion, a date acquisition portion, a first storage portion, a second storage portion, a first extraction portion, a second extraction portion, and an execution control portion. The power acquisition portion is configured to acquire an amount of consumed power by a load from a start time of an object period to a prescribed time point within the object period. The date acquisition portion is configured to acquire a date of the prescribed time point. The first storage portion is configured to store a state determination table, the state determination table indicating correspondence relationships in which target achievement levels indicating possibilities of target achievements are associated with combinations with a plurality of division periods and a plurality of ranges of amount of power. The plurality of division periods are in the object period. The plurality of ranges of amount of power are obtained in a range equal to or less than a target value of the amount of power to be consumed in the object period. The second storage portion is configured to store an action table. The action table indicates correspondence relationships with operations for making an execution portion perform and target achievement levels. The first extraction portion is configured to extract, from the state determination table, a target achievement level corresponding to a combination with a division period including the date acquired by the date acquisition portion and a range of consumed power including the amount of consumed power acquired by the power acquisition portion. The second extraction portion is configured to extract, from the action table, an operation corresponding to the target achievement level extracted by the first extraction portion. The execution control portion is configured to control the execution portion to perform the operation extracted by the second extraction portion.

According to the management device, the management system, and the program of the present invention, it is possible to perform a processing suitable for each time point in the object period so that the amount of power to be consumed in the object period becomes equal to or less than the target value.

BRIEF DESCRIPTION OF DRAWINGS

Preferred embodiments of the present invention will now be described in further details. Other features and advantages of the present invention will become better understood with regard to the following detailed description and accompanying drawings where:

FIG. 2 is a drawing illustrating a state determination table used in the first embodiment;

FIG. 3 is a drawing illustrating an action table used in the first embodiment;

FIGS. 9A to 9D are drawings illustrating consumed power history tables used in a third embodiment;

DESCRIPTION OF EMBODIMENTS

Each of management devices according to first to fourth embodiments described later is a device that is configured to lead, at a prescribed time point within the object period, the amount of power to be consumed in the whole object period to be equal to or less than a target value.

Each management device is configured to store a state determination table used for determining a target achievement level of the present time (prescribed time point within the object period) and an action table for specifying an operation corresponding to the target achievement level.

The state determination table indicates correspondence relationships in which target achievement levels are respectively associated with combinations with a plurality of division periods in the object period and a plurality of ranges of amount of power in ranges of amount of power equal to or less than a target value of the amount of power to be consumed in the object period.

The action table indicates correspondence relationships with operations for making an execution portion perform and the target achievement level.

Each management device is configured to extract, from the state determination table, a target achievement level corresponding to a combination with a division period including the present date and a range of amount of power including the amount of consumed power from the start time of the object period to the present time, and then extract, from the action table, an operation corresponding to the extracted target achievement level. Then, each management device is configured to control the execution portion to perform the extracted operation.

Hereinafter, the first to fourth embodiments will be described with reference to the drawings.

First Embodiment

Figure 1:
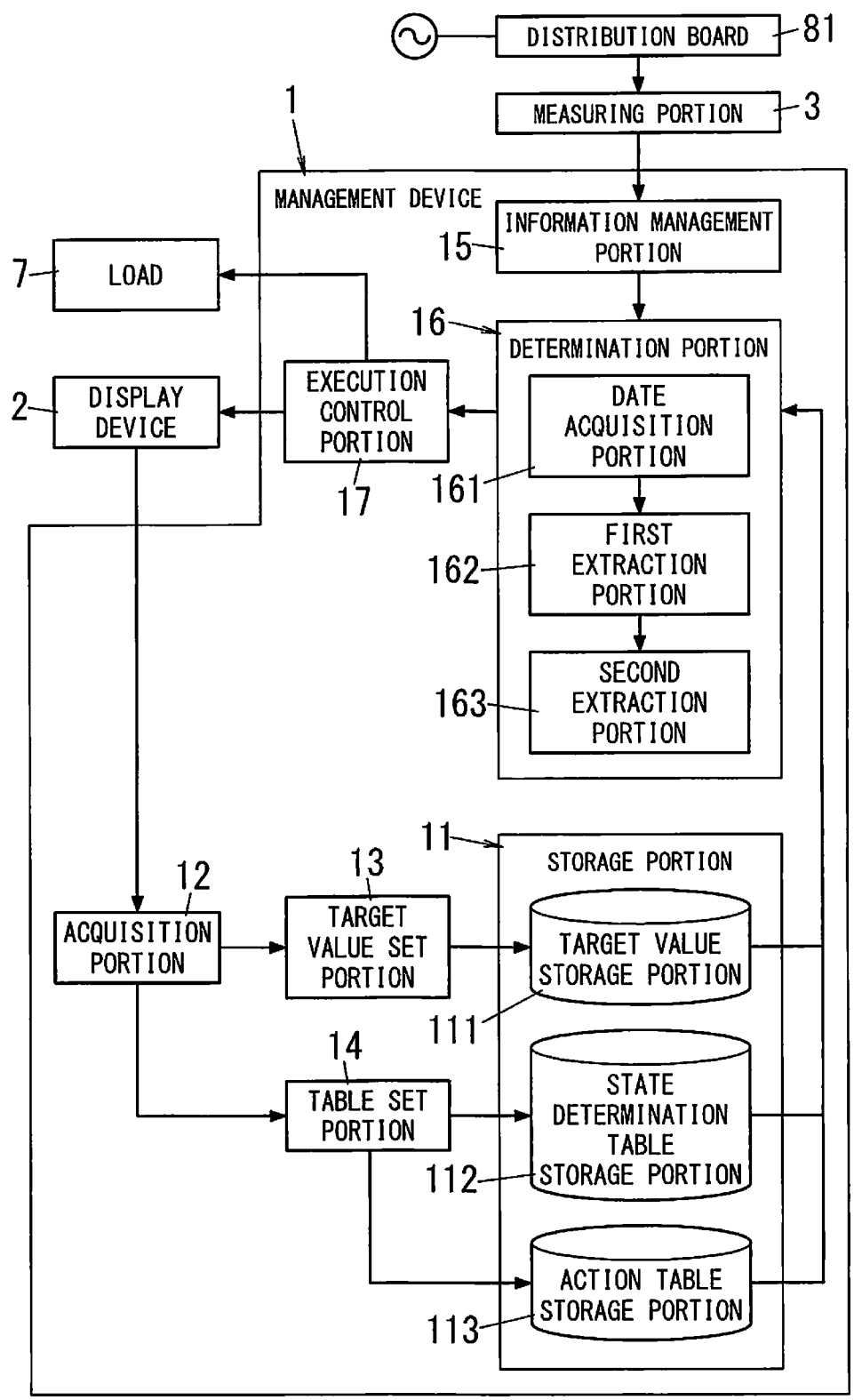
FIG. 1 is a block diagram illustrating a configuration of a management system according to a first embodiment.

As shown in FIG. 1, a management system according to a first embodiment includes a management device 1, a display device (an execution portion, an input device) 2, and a measuring portion 3. The management device 1 is configured to manage power consumption by a load 7. The display device 2 has a display function and an input function. The measuring portion 3 is configured to measure consumed power by the load 7.

The display device 2 includes a display portion and an input portion. The display portion is configured to display various pieces of information. The input portion is configured to receive an input operation by a user. The input portion is configured to receive an input of a target value of the amount of power to be consumed by the load 7 in the object period. Further, the input portion is configured to receive an input of the content of the operation that the execution portion (the display device 2, the load 7) is made to perform. The input portion may be configured to select the content of the operation from some candidates.

The measuring portion 3 is inserted into a feed line that connects a distribution board 81 and the load 7. The measuring portion 3 is configured to measure the amount of consumed power by the load 7 per unit time. Therefore, the measuring portion 3 can measure the amount of consumed power to the present time from the start point in the object period.

The distribution board 81 includes a main breaker and two or more branch breakers that are not shown. The main breaker is configured to output, to each branch breaker, AC power from a commercial power system and a power conditioner 85 (refer to FIG. 10). Each branch breaker is configured to supply electric power from the main breaker to the load 7.

The management device 1 includes a storage portion 11, an acquisition portion (an operation content acquisition portion) 12, a target value set portion 13, a table set portion (an operation content changing portion) 14, a power-consumption-information management portion (a power acquisition portion, hereinafter referred to as a "information management portion") 15, an determination portion 16, and an execution control portion 17. The storage portion 11 includes a target value storage portion 111, a state determination table storage portion (a first storage portion) 112, and an action table storage portion (a second storage portion) 113. The target value storage portion 111 is configured to store the target value. The state determination table storage portion 112 is configured to store the state determination table 4. The action table storage portion 113 is configured to store the action table 5. The management device 1 is capable of communicating with the load 7 by a cable or radio. Therefore, the management device 1 can control the load 7.

The state determination table 4 is a table that has information used for determining whether or not the amount of consumed power by the present time (the prescribed time point within the object period) is favorable to the target value. As shown in FIG. 2, in the state determination table 4, combinations with division periods and the ranges of amount of power are respectively associated with target achievement levels each which indicates a possibility of target achievement, in the plurality of division periods and the plurality of ranges of amount of power. The plurality of division periods are obtained by dividing the object period into a plurality of periods. The plurality of ranges of amount of power are obtained by dividing the range of amount of power equal to or less than the target value of the amount of power to be consumed in the object period. In an example in FIG. 2, the object period is one month (thirty days). The object period is divided into three division periods: a first period from the first to the tenth; a second period from the eleventh to the twentieth; and a third period from the twenty-first to the thirtieth (end of month). The range of amount of power equal to or less than the target value is divided into three ranges of amount of power: a first range of 0 to 40 kWh; a second range of 40 to 80 kWh; and a third range of 80 to 120 kWh. The range of 0 to 40 kWh (first range) indicates a range of more than 0 kWh and equal to or less than 40 kWh. The range of 40 to 80 kWh (second range) indicates a range of more than 40 kWh and equal to or less than 80 kWh. The range of 80 to 120 kWh (third range) indicates a range of more than 80 kWh and equal to or less than 120 kWh. In the state determination table 4, the number of the division periods is not limited to three, and the number of the ranges of amount of power is also not limited to three.

The target achievement levels include two or more levels according to power consumption situations of the load 7, that is, the target achievement situations of the load 7. In the present embodiment, the target achievement levels include four levels: "margin" (L1 in FIG. 2); "good" (L2 in FIG. 2); "caution" (L3 in FIG. 2); and "warning" (L4 in FIG. 2). The number of the target achievement levels is not limited to four. Examples of the contents of the target achievement levels are not limited to the "margin", the "good", the "caution", and the "warning".

For example, the state determination table 4 shown in FIG. 2 indicates information used in the case where the object period is one month (thirty days in the example of FIG. 2) and the target value is 120 kWh. In the state determination table 4, the "good" (second level L2) is associated as the target achievement level when the amount of consumed power is included in the first range (0 to 40 kWh), in the case where the division period is the first period (first to tenth). The "caution" (third level L3) is associated as the target achievement level when the amount of consumed power is included in the second range (40 to 80 kWh), and the "warning" (fourth level L4) is associated as the target achievement level when the amount of consumed power is included in third range (80 to 120 kWh). In the case where the division period is the second period (eleventh to twentieth), the "margin" (first level L1) is associated as the target achievement level when the amount of consumed power is included in the first range (0 to 40 kWh). The "good" (second level L2) is associated as the target achievement level when the amount of consumed power is included in the second range (40 to 80 kWh). The "caution" (third level L3) is associated as the target achievement level when the amount of consumed power is included in the third range (80 to 120 kWh). In the case where the division period is the third period (twenty-first to thirtieth or end of month, the "margin" (first level L1) is associated as the target achievement level when the amount of consumed power is included in the first range (0 to 40 kWh) or the second range (40 to 80 kWh). The "good" (second level L2) is associated as the target achievement level when the amount of consumed power is included in the third range (80 to 120 kWh).

The action table 5 is a table used for defining the operation corresponding to the target achievement level determined using the state determination table 4. As shown in FIG. 3, in the action table 5, the target achievement levels are associated with operations for making the execution portion perform. That is, in the action table 5, the operation is defined for each target achievement level. In the present embodiment, the execution portion is the display device 2 or the load 7. The action table 5 may be set in advance and may be dynamically generated according to a power consumption situation.

Examples of the operation defined in the action table 5 include reporting by the display device 2, controlling the load 7 (apparatus control), and transmitting a mail. Reporting by the display device 2 is reporting, to the outside, of a content according to the target achievement level of the present time (the prescribed time point within the object period) by the display device 2 as the reporting portion. Examples of the reporting include a screen display using the display device 2 and voice reporting. Examples of the screen display include a display of a text (announcement contents or advice), a mark, an initial screen, or an apparatus control screen. As the above-mentioned screen display, a text or a mark may be displayed with a graph, and color of the screen may be changed. Examples of the above-mentioned text include: an announcement content that notifies of the present power consumption situation; and an advice for leading so that the target can be achieved. Example of the voice reporting includes a voice response of a text (announcement content or advice). When the load 7 includes an LED (Light Emitting Diode), there is lighting of the LED as the operation defined in the action table 5. The operation defined in the action table 5 is not limited to the above-mentioned operations.

For example, in the action table 5 shown in FIG. 3, when the target achievement level is the "margin" (first level L1), the display of the announcement contents "the target could be achieved even if it is consumed more", and the display of the mark of a smiling face are associated as one operation. When the target achievement level is the "good" (second level L2), the display of the announcement contents "the target could be achieved at this tune", and the display of the mark of a faint smiling face are associated as one operation. When the target achievement level is the "margin" or the "good", the apparatus control for reducing the amount of power to be consumed is not associated. On the other hand, when the target achievement level is the "caution" (third level L3), the display of the announcement contents "the target could be achieved if it refrains from consumption for a while", the display of the mark of a normal face, and the apparatus control for an energy-saving operation are associated as one operation. The energy-saving operation is an operation suppressed more than the normal operation that is an operation when the target achievement level is the "margin" or the "good". The energy-saving operation can reduces the amount of power to be consumed less than the normal operation. When the target achievement level is the "warning" (fourth level L4), the display of the announcement contents "the target could not be achieved", the display of the mark of a troubled face, and the apparatus control of forcibly turning off are associated as one operation. Forcibly turning off is to forcibly turn off the load 7.

The acquisition portion 12 shown in FIG. 1 is configured to acquire, from the display device 2, the input information received by the display device 2. Specifically, the acquisition portion 12 is configured to acquire the target value and the content of the operation defined in the action table 5.

The target value set portion 13 is configured to set, as a formal target value, the target value acquired by the acquisition portion 12. The target value storage portion 111 is configured to store the target value set by the target value set portion 13.

The table set portion 14 is configured to change, into the content acquired by the acquisition portion 12, the operation of the action table 5 stored in the action table storage portion 113.

The information management portion 15 is configured to acquire the measuring result of the measuring portion 3, and periodically (for example, for each one day, prescribed time point within the object period) calculate the amount of consumed power from the start time of the object period to the present time. The information management portion 15 is configured to manage the calculated amount of consumed power. The information management portion 15 constitutes the power acquisition portion that is configured to acquire the amount of consumed power by the load 7 from the start time of the object period to the present time (the prescribed time point within the object period).

The determination portion 16 includes a date acquisition portion 161, a first extraction portion 162, and a second extraction portion 163. The date acquisition portion 161 is configured to acquire date information. The first extraction portion 162 is configured to extract the target achievement level from the state determination table 4. The second extraction portion 163 is configured to extract the operation from the action table 5.

The date acquisition portion 161 is configured to periodically (for example, for each one day, the prescribed time point within the object period) acquire, from a real time clock (RTC) that is not illustrated, for example, the date information that shows the present date.

The first extraction portion 162 is configured to periodically (for example, for each one day, the prescribed time point within the object period) extract, from the state determination table 4, a target achievement level corresponding to the combination with the present date and the amount of consumed power from the start time of the object period to the present time. That is, the first extraction portion 162 is configured to extract, a target achievement level corresponding to the combination from the state determination table 4, using a combination with a division period including the date acquired by the date acquisition portion 161 and a range of amount of power including the amount of consumed power acquired by the information management portion 15.

The second extraction portion 163 is configured to extract, from the action table 5, an operation corresponding to the target achievement level extracted by the first extraction portion 162.

The execution control portion 17 is configured to control the display device 2 and the load 7 to perform the operation extracted by the second extraction portion 163. When especially the target achievement level is the "caution" or the "warning", the execution control portion 17 is configured to perform the operation, such as making the display device 2 show the information to a user, or stopping the load 7.

The storage portion 11 is configured to store a program for causing the management device 1 (computer) to perform various kinds of functions. That is, the storage portion 11 is configured to store a program for causing the management device 1 to function as the storage portion 11, the acquisition portion 12, the target value set portion 13, the table set portion 14, the information management portion 15, the determination portion 16, and the execution control portion 17. The above-mentioned program is previously stored in the storage portion 11 at the time of shipment of the management device 1. However, the management device 1 may acquire the above-mentioned program after shipping. In this case, as an example of the technique with which the management device 1 acquires the above-mentioned program, there is a technique using a recording medium readable in the computer, which records the above-mentioned program. In the case of the technique using the recording medium, the management device 1 may include a reader (not shown) for reading data in the recording medium. Examples of the recording medium include an optical disc, and a memory card. Examples of the reader include a drive device that is configured to read out information in an optical disc and a memory card reader that is configured to read out information in a memory card. As another technique with which the management device 1 acquires the above-mentioned program, there is a technique of downloading the above-mentioned program from another apparatus (server, for example) using a network. In the case of the technique of downloading the above-mentioned program, the management device 1 may have a communication function (not shown) for communicating with another apparatus using a network.

Figure 4:
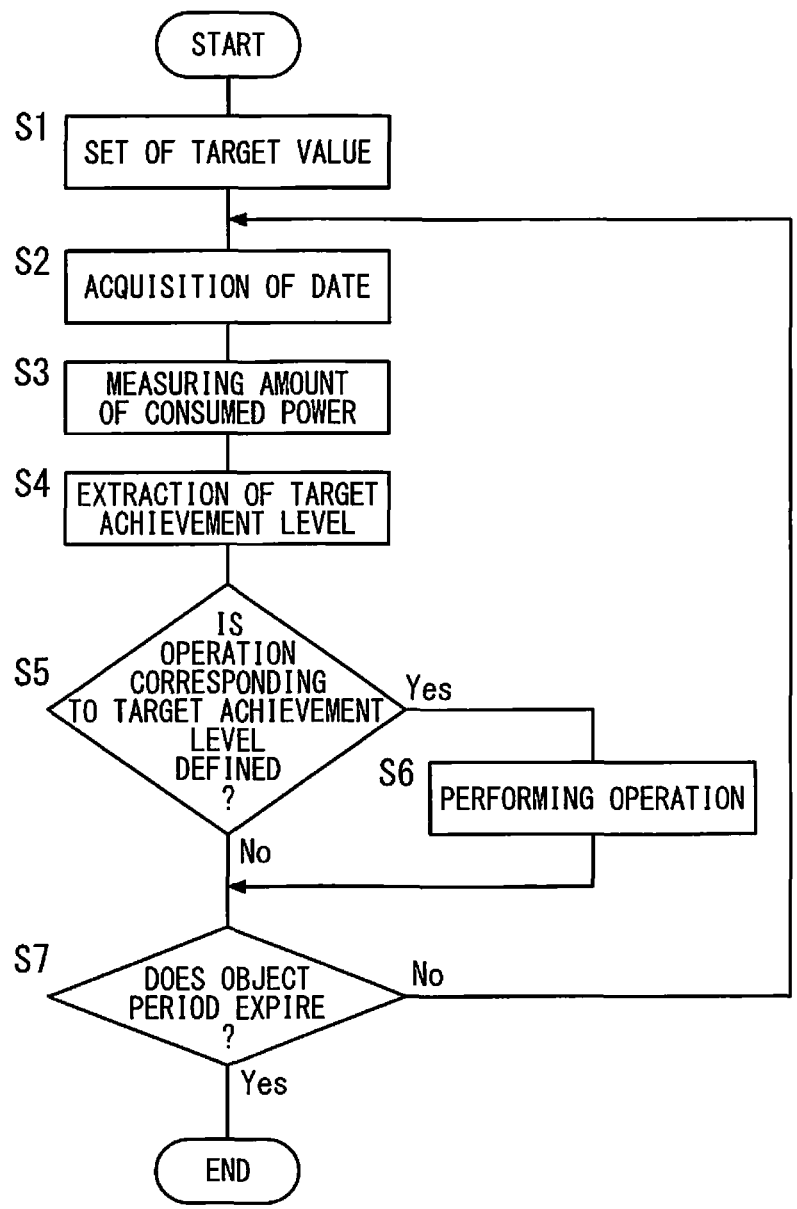
FIG. 4 is a flow chart illustrating an operation of a management device according to the first embodiment.

Next, an operation of the management system according to the present embodiment will be described with reference to FIG. 4. First, if a user inputs, into the display device 2, the target value of the amount of power to be consumed, the target value set portion 13 of the management device 1 sets the target value of the present month (S1).

Then, the date acquisition portion 161 of the management device 1 acquires the date (S2). The measuring portion 3 measures the amount of consumed power, and the information management portion 15 measures the amount of consumed power from the start time of the object period to the present time using the measuring result of the measuring portion 3 (S3). Then, the first extraction portion 162 checks, with the state determination table 4, a combination with the date and the amount of consumed power, and extracts the target achievement level corresponding to this combination (S4). Then, the second extraction portion 163 checks, with the action table 5, the target achievement level extracted by the first extraction portion 162. When the operation corresponding to this target achievement level is defined (Yes of S5), the second extraction portion 163 extracts the above-mentioned operation. Then, the execution control portion 17 controls the display device 2 and the load 7, and the display device 2 and the load 7 perform the operation extracted by the management device 1 (S6). When the operation corresponding to the target achievement level is not defined in the step S5 (No of S5), or when the object period does not expire after the step S6 (No of S7), the operation of the management system returns to the step S2. On the other hand, when the object period expires (Yes of S7), the management system ends the operation.

For example, in the state determination table 4 shown in FIG. 2, a trigger is generated when much power is consumed on the ninth, and then the amount of consumed power by the ninth is 81 kWh (warning) although the amount of consumed power by the eighth is 38 kWh (good). In this case, the execution control portion 17 of the management device 1 performs the operation corresponding to the "warning" defined in the action table 5 (the display of text "the target could not be achieved", the control of forcibly turning off the load 7).

On the other hand, when the amount of consumed power by the tenth and the amount of consumed power by the eleventh are respectively 38 kWh and 39 kWh, the target achievement level is the "margin". In this case, the execution control portion 17 performs the operation corresponding to the "margin" in the action table 5 (display of text "the target could be achieved even if it is consumed more").

Figure 5:
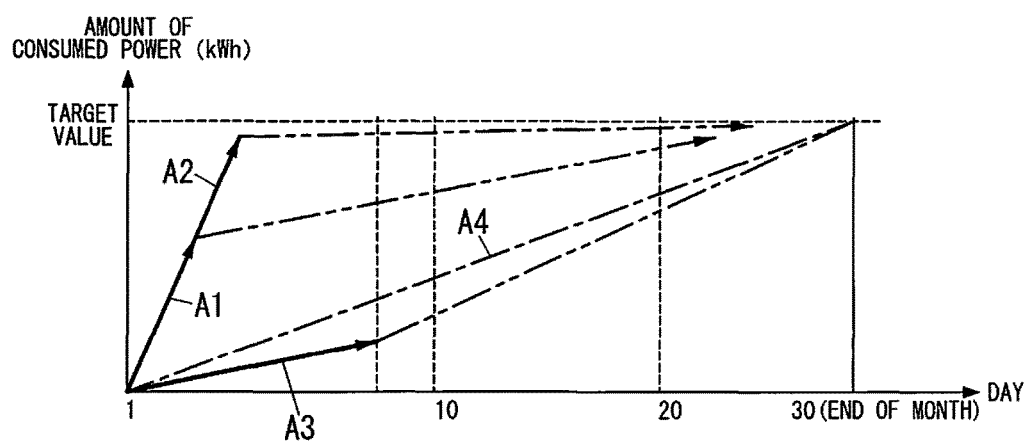
FIG. 5 is a drawing for describing the operation of the management device according to the first embodiment.

As shown in FIG. 5, when the amount of consumed power is more than a value on a basic line (A4 in FIG. 5) and about 50% of the target value in the division period of the first to the tenth (A1 in FIG. 5), the target could be achieved if the energy saving is performed a little. Therefore, the target achievement level is the "caution". However, in the case where the amount of consumed power increases at the same ratio also after that and becomes close to the target value (A2 in FIG. 5), it is impossible to achieve the target. Therefore, the target achievement level is the "warning".

On the other hand, in the division period of the first to the tenth, when the amount of consumed power is less than the value on the basic line (A4 in FIG. 5) (A3 in FIG. 5), the target could be achieved even if the amount of consumed power increases rather than before. Therefore, the target achievement level is the "margin".

The management device 1 according to the present embodiment described above is configured to control the display device 2 and the load 7 to perform the operation according to the target achievement level, which indicates the possibility of the present target achievement, in order to achieve the target: the amount of power to be consumed in the object period is equal to or less than the target value. Therefore, according to the present embodiment, it is possible to improve the possibility that the amount of power to be consumed in the object period becomes equal to or less than the target value. That is, the management device 1 determines automatically whether or not the amount of consumed power from the start time of the object period to the present time exceeds the target value, and then reports that power is consumed too much or power consumption is favorable, and/or controls the operation of the load 7 to decrease the future amount of power to be consumed.

In the present embodiment, it is possible to advise the user so that the change of the amount of power to be consumed until the object period expires is optimal by making the display device 2 report the content according to the present target achievement level.

In the present embodiment, it is possible to make the display device 2 and the load 7 perform the operations according to the user's request by changing the operation in the action table 5 into the content of the operation inputted by the user.

Second Embodiment

A management system according to a second embodiment is different from the management system according to the first embodiment in that a management device 1 is configured to dynamically determine contents in a state determination table 4. Note that constituent elements similar to those in the management system according to the first embodiment are provided with the same reference numerals, and the descriptions thereof will be omitted.

The state determination table 4 is set in advance in the first embodiment, while the management device 1 is configured to learn a user's power consumption situation and dynamically determine the contents in the state determination table 4 in the present embodiment.

Figure 6:
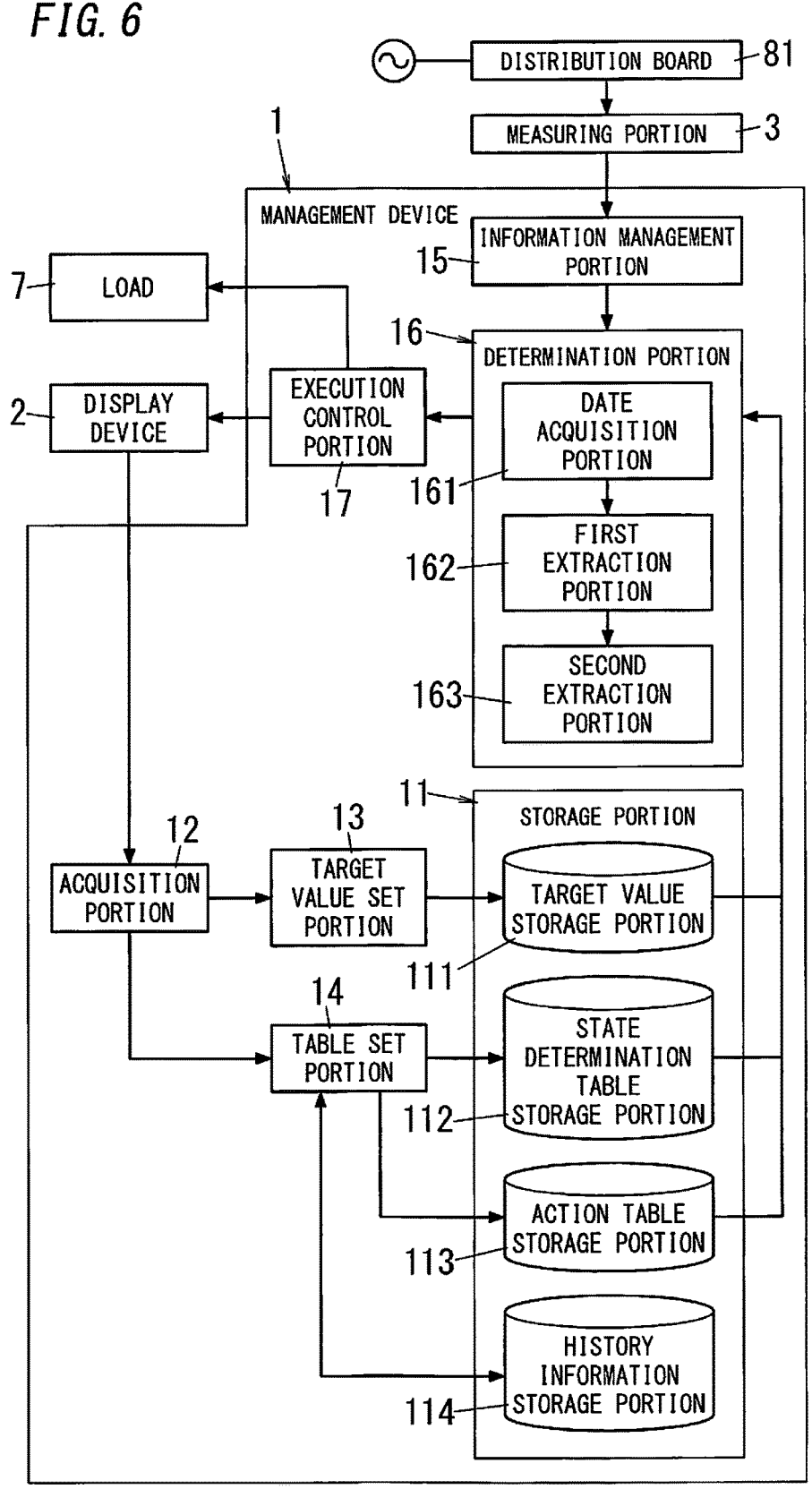
FIG. 6 is a block diagram illustrating a configuration of a management device according to a second embodiment.

As shown in FIG. 6, a storage portion 11 of the present embodiment is further includes a history information storage portion 114. The history information storage portion 114 is configured to store a consumed power history table 6. The history information storage portion 114 is configured to manage the amount of consumed power before using the consumed power history table 6.

Figure 7:
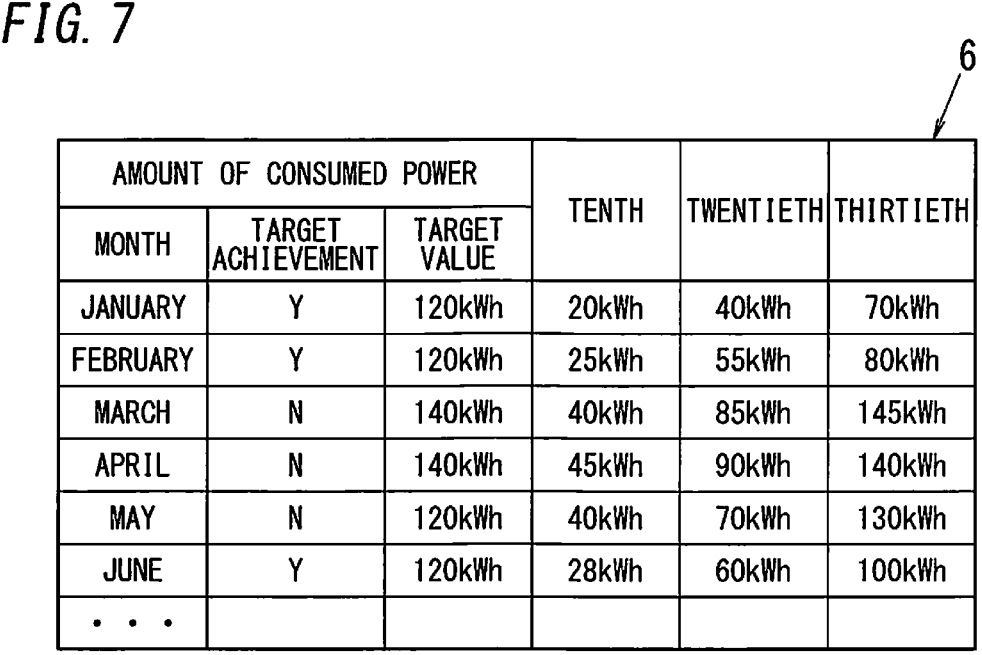
FIG. 7 is a drawing illustrating a consumed power history table used in the second embodiment.

As shown in FIG. 7, the consumed power history table 6 has history information in which a past object period corresponds to the amount of consumed power in the past object period. Specifically, the consumed power history table 6 has, for each month, a target value, a target achievement result, and the amounts of consumed power. That is, the consumed power history table 6 has, as the amount of consumed power, the amount of consumed power from the first to the tenth (the amount of consumed power for ten days), the amount of consumed power from the first to the twentieth (the amount of consumed power for twenty days), and the amount of consumed power from the first to the thirties (end of month) (the amount of consumed power for thirty days). FIG. 7 shows, as the target achievement result, "Y" when the amount of consumed power for one month is equal to or less than the target value, and "N" when the amount of consumed power for one month is more than the target value.

A table set portion 14 of the present embodiment includes a division changing portion. The division changing portion is configured to change division periods and ranges of amount of power in the state determination table 4 according to the history information in the consumed power history table 6 stored by the history information storage portion 114. The table set portion 14 is configured to dynamically update the state determination table 4 at a time point such as the end of the month. The descriptions about the same functions as the table set portion 14 (refer to FIG. 1) of the first embodiment will be omitted.

The table set portion 14 is configured to extract, from the consumed power history table 6 shown in FIG. 7, the amounts of consumed power from the first to the tenth in the months (for example, in the case where the target values are 120 kWh, January, February, and June) in which the target values are the same as each other and the targets were achieved (here, 20 kWh, 25 kWh, and 28 kWh). Then, the table set portion 14 is configured to update, to 0 to 28 kWh, a range of consumed power (first range) of period from the first to the tenth in the state determination table 4 while setting, to the upper limit value, the maximum value of 28 kWh in the extracted amounts of consumed power. That is, the table set portion 14 is configured to change, into 0 to 28 kWh, the range of amount of consumed power associated with the target achievement level "good" in the first period (first to tenth). A range of 0 to 28 kWh indicates a range of more than 0 kWh and equal to or less than 28 kWh.

Similarly, the table set portion 14 is configured to extract, from the consumed power history table 6, the amounts of consumed power from the first to the twentieth (40 kWh, 55 kWh, and 60 kWh). Then, the table set portion 14 is configured to update, to 28 to 60 kWh, a range of consumed power (second range) of a period from the eleventh to the twentieth of the state determination table 4 while setting, to the upper limit value, the maximum value of 60 kWh in the extracted amounts of consumed power. That is, the table set portion 14 is configured to change, into 28 to 60 kWh, the range of amount of consumed power associated with the target achievement level "good" in the second period (eleventh to twentieth). A range of 28 to 60 kWh indicates a range of more than 28 kWh and equal to or less than 60 kWh.

Similarly, the table set portion 14 is configured to extract, from the consumed power history table 6, the amounts of consumed power from the first to the thirtieth (end of month) (70 kWh, 80 kWh, and 100 kWh). Then, the table set portion 14 is configured to update, to 60 to 100 kWh, a range of amount of consumed power (third range) of the twenty-first to the end of the month in the state determination table 4 while setting, to the upper limit value, the maximum value of 100 kWh in the extracted amounts of consumed power. That is, the table set portion 14 is configured to change, into 60 to 100 kWh, the range of amount of consumed power associated with the target achievement level "good" in the third period (twenty-first to end of month). A range of 60 to 100 kWh indicates a range of more than 60 kWh and equal to or less than 100 kWh.

Figure 8:
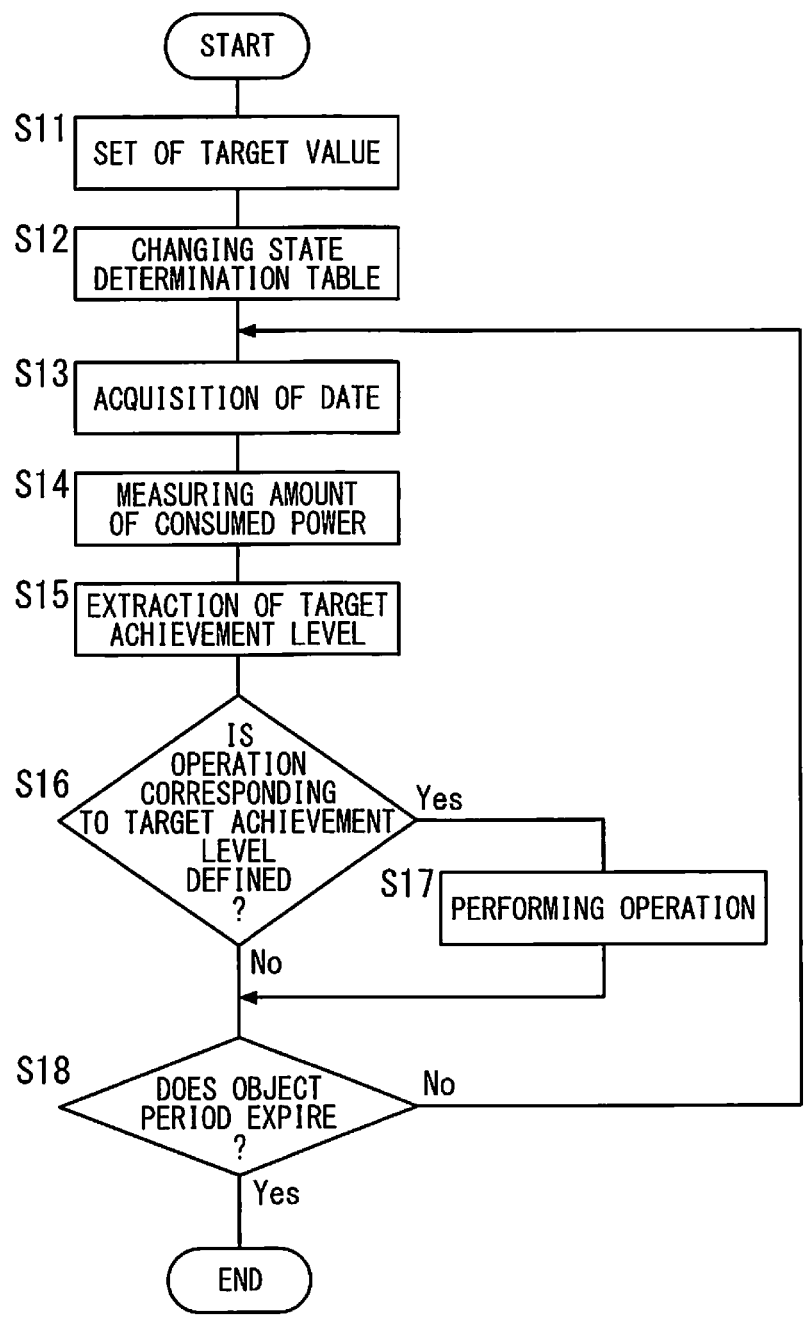
FIG. 8 is a flow chart illustrating an operation of the management device according to the second embodiment.

Next, an operation of the management system according to the present embodiment will be described with reference to FIG. 8. First, if a user inputs, into the display device 2, the target value of the amount of power to be consumed, a target value set portion 13 of the management device 1 sets the target value of the present month (S11). Then, the table set portion 14 extracts, from the consumed power history table 6, the amount of consumed power by the tenth, the twentieth, and the thirtieth (end of month) of the months in which the target values are the same as each other and the targets were achieved. Then, the table set portion 14 changes each of the plurality of ranges of amount of power in the state determination table 4 while setting, to a boundary value, the maximum of the extracted amounts of consumed power (S12).

Then, a date acquisition portion 161 of the management device 1 acquires the present date (S13). A measuring portion 3 measures the amount of consumed power, and an information management portion 15 measures the amount of consumed power from the start time of the object period to the present time using the measuring result of the measuring portion 3 (S14). Then, the history information storage portion 114 stores, in the consumed power history table 6, the target value, the amount of consumed power (addition power), and the target achievement result (in the case of the thirtieth) of the present month at the tenth, the twentieth, and the thirtieth (end of month). Then, a first extraction portion 162 checks, with the state determination table 4, a combination with the date and the amount of consumed power, and extracts the target achievement level corresponding to this combination (S15). Then, a second extraction portion 163 checks, with the action table 5, the target achievement level extracted by the first extraction portion 162. When the operation corresponding to this target achievement level is defined (Yes of S16), the second extraction portion 163 extracts the above-mentioned operation. Then, an execution control portion 17 controls the display device 2 and the load 7, and the display device 2 and the load 7 perform operations extracted by the management device 1 (S17). When the operation corresponding to the target achievement level is not defined in the step S16 (No of S16), or when the object period does not expire after the step S17 (No of S18), the operation of the management system returns to the step S13. On the other hand, when the object period expires (Yes of S18), the management system ends the operation.

According to the present embodiment described above, it is possible to dynamically change the condition of the operation (the display of an advice, the operation of the load 7) of making the display device 2 and the load 7 perform, by changing the division periods and the ranges of amount of consumed power based on the history information. Therefore, it is possible to make the display device 2 and the load 7 perform the operation specialized in power consumption for each user. For example, it is possible to present the high-precision advice specialized in the power consumption for each user. That is, it is possible to learn the tendency about the user's power consumption and dynamically optimize the state determination table 4. Therefore, it is possible to perform the high-precision operation (an advice display, apparatus control) while further matching with the user's power consumption.

Third Embodiment

A management system according to a third embodiment is different from the management system according to the second embodiment in that a management device 1 is configured to dynamically determine contents in a state determination table 4 for each season. Note that constituent elements similar to those in the management system according to the second embodiment are provided with the same reference numerals, and the descriptions thereof will be omitted.

The management device 1 according to the present embodiment is configured to manage power consumption for each season, and dynamically change the contents in the state determination table 4, in consideration of a difference in the amounts of power to be consumed between the seasons.

As shown in FIGS. 9A to 9D, consumed power history tables 6a to 6d of the present embodiment are respectively provided so as to correspond to seasons (spring, summer, autumn, and winter) although being fundamentally the same as the consumed power history table 6 (refer to FIG. 7) of the second embodiment. Therefore, the management device 1 according to the present embodiment can dynamically determine the state determination table 4 corresponding to the tendency of power consumption for each season. FIGS. 9A to 9D show, as a target achievement result, "Y" when the amount of consumed power for one month is equal to or less than a target value, and "N" when the amount of consumed power for one month is more than the target value. A target value storage portion 111 of the present embodiment is configured to store a default value of the target value for each season.

The table set portion 14 of the present embodiment is configured to dynamically change the target value in the state determination table 4 by changing the target value into a value inputted in a display device 2 by a user, or learning and managing the amount of consumed power in the months in which the target was achieved for each month. For example, when the target was achieved, the table set portion 14 changes, as the target value of the season, a value that is obtained by subtracting a constant amount from the amount of consumed power for the month in which the target was achieved.

For example, when the season is summer, the target value storage portion 111 stores a default value of 300 kWh for the target value of summer. As shown in FIG. 9B, because the target was achieved for all three months in June to August, the table set portion 14 resets, to the target value of summer, 260 kWh that is obtained by subtracting 10 kWh from the minimum amount of 270 kWh in the amounts of consumed power from June to August.

As a method of dynamically determining the range of amount of consumed power, there is a method of setting the range of amount of consumed power with, for example, an average value of the amounts of consumed power for ten days (a period from the first to the tenth) in the months in which the targets were achieved, and an average value of the amounts of consumed power for twenty days (a period from the first to the twentieth) in the months in which the targets were achieved, and an average value of the amounts of consumed power for thirty days (one month) in the months in which the targets were achieved. For example, in the consumed power history table 6c for autumn, as shown in FIG. 9C, the months in which the targets were achieved are September and October. In these months, the average value of the amounts of consumed power from the first to the tenth, the average value of the amounts of consumed power from the first to the twentieth, and the average value of the amounts of consumed power from the first to the thirties (end of month) are respectively 22.5 kWh, 47.5 kWh, and 75 kWh. Therefore, the table set portion 14 changes, to 0 to 22.5 kWh, 22.5 to 47.5 kWh, 47.5 to 75 kWh, the range of consumed power (first range) of the first to the tenth, the range of consumed power (second range) of the eleventh to the twentieth, and the range of consumed power (third range) of the twenty-first to the end of the month in the state determination table 4, respectively. The range of 0 to 22.5 kWh (first range) indicates a range of more than 0 kWh and equal to or less than 22.5 kWh. The range of 22.5 to 47.5 kWh (second range) indicates a range of more than 22.5 kWh and equal to or less than 47.5 kWh. The range of 47.5 to 75 kWh (third range) indicates a range of more than 47.5 kWh and equal to or less than 75 kWh.

According to the present embodiment described above, it is possible to learn the tendency about the user's power consumption and dynamically optimize the state determination table 4 while taking the using tendency for each season into consideration. Therefore, it is possible to perform the high-precision operation (an advice display, apparatus control) while further matching with the user's power consumption.

Fourth Embodiment

Figure 10:
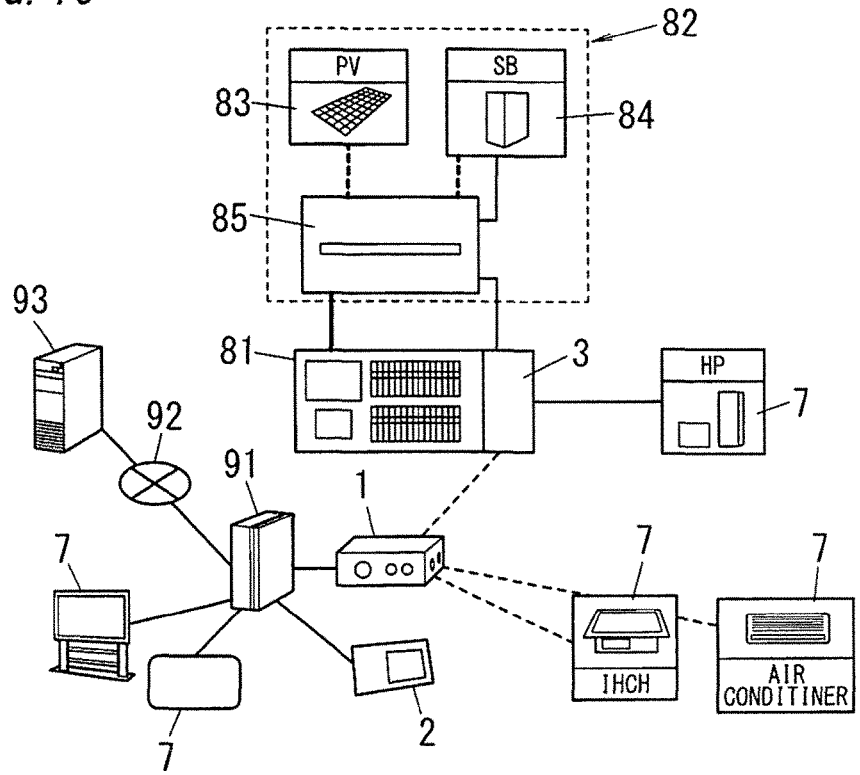
FIG. 10 is a configuration diagram of a feed system according to a fourth embodiment.
Figure 11:
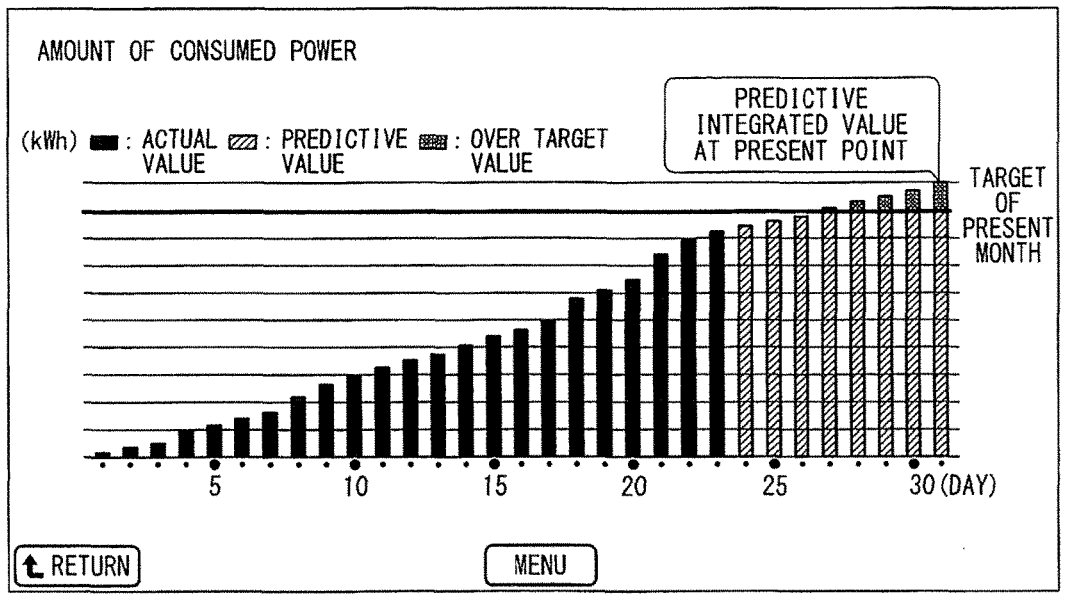
FIG. 11 is a drawing illustrating a display screen of a display device.

A feed system shown in FIG. 10 will be described, to which the management system according to any one of the first to third embodiments is applied.

The feed system according to the present embodiment includes a management device 1, a distribution board 81, and a device 82 for making and storing power. The distribution board 81 is configured to distribute power to two or more loads 7. The feed system according to the present embodiment is used to a dwelling portion as a single house. The feed system is a system that supplies power to the two or more loads 7 with a commercial power system, a solar cell 83, and a storage battery 84.

The device 82 for making and storing power includes the solar cell 83, the storage battery 84, and a power conditioner 85. The power conditioner 85 is configured to convert, into AC power, DC power from the solar cell 83 and the storage battery 84.

The solar cell 83 is installed on a roof of the dwelling portion, for example, and is configured to perform photovoltaics. That is, the solar cell 83 is configured to generate DC power using sunlight energy.

The storage battery 84 is a nickel hydrogen battery, a lithium ion battery, or the like. The storage battery 84 is configured to store power generated by the solar cell 83 and commercial power from the commercial power system at the time of grid connected operation.

The power conditioner 85 is configured to convert DC power from the solar cell 83 and the storage battery 84 into AC power, and output this AC power to the distribution board 81. The power conditioner 85 is configured to make the storage battery 84 charge DC power generated by the solar cell 83. The power conditioner 85 is configured to convert AC power from the commercial power system into DC power, and make the storage battery 84 store the converted DC power.

The management device 1 is connected with a server 93 via a router 91 and a network 92. The management device 1 is configured to communicate with the server 93 via the network 92. The management device 1 is configured to transfer information to the display device 2 and receive information from the display device 2 via the router 91.

According to the present embodiments described above, the management system of any one of the first to third embodiments can be applied to the feed system supplying power to the load 7, and this feed system can manage the power consumption by the load 7.

Although the present invention has been described with reference to a certain preferred embodiment, numerous modifications and variations can be made by those skilled in the art without departing from the true spirit and scope of this invention, namely claims.

The invention claimed is:

1. A management device comprising:
a power acquirer configured to acquire an amount of consumed power by a load from a start time of an object period to a prescribed time point within the object period;
a date acquirer configured to acquire a date of the prescribed time point;
a first storage configured to store a state determination table, the state determination table indicating correspondence relationships in which target achievement levels indicating possibilities of target achievements are respectively associated with combinations with a plurality of division periods and a plurality of ranges of amount of power, the plurality of division periods being obtained by the object period being divided in time series, each division period representing a cumulated energy consumption value from a start of the object period up to an end of the division period, the plurality of ranges of amount of power being obtained by a range of amount of power being divided, the range of amount of power being a range equal to or less than a target value of an amount of power to be consumed in the object period, in each of the plurality of ranges of amount of power, at least two target achievement levels being different from each other, the at least two target achievement levels being respectively associated with combinations with a range of amount of power and at least two division periods of the plurality of division periods;
a second storage configured to store an action table, the action table indicating correspondence relationships with operations for making an executor perform and the target achievement levels;
a first extractor configured to extract, from the state determination table, a target achievement level corresponding to a combination with a division period of the plurality of division periods, which includes the date acquired by the date acquirer and a range of amount of power of the plurality of ranges of amount of power, which includes the amount of consumed power acquired by the power acquirer;
a second extractor configured to extract, from the action table, an operation corresponding to the target achievement level extracted by the first extractor;
an execution controller configured to control the executor to perform the operation extracted by the second extractor;
an operation content acquirer configured to acquire a content of at least one of the operations from an input device configured to receive an input of the content of the at least one of the operations; and
an operation content changer configured to change the at least one of the operations in the action table, stored by the second storage, to the content acquired by the operation content acquirer.

2. The management device according to claim 1, further comprising:
a history information storage configured to store history information in which a past object period is associated with an amount of consumed power in the past object period; and
a division changer configured to change the plurality of division periods and the plurality of ranges of amount of power in the state determination table according to the history information stored by the history information storage.

3. The management device according to claim 1, wherein the executor is a reporter configured to perform external reporting, and
wherein the operation includes reporting, by the reporter, a content according to the target achievement level of the prescribed time point.

4. A management system comprising:
the management device according to claim 1; and
a measurer configured to measure the amount of consumed power from the start time of the object period to the prescribed time point within the object period.

5. The management device according to claim 2,
wherein the executor is a reporter configured to perform external reporting, and
wherein the operation includes reporting, by the reporter, a content according to the target achievement level of the prescribed time point.

6. A management system comprising:
the management device according to claim 2; and
a measurer configured to measure the amount of consumed power from the start time of the object period to the prescribed time point within the object period.

7. A management system comprising:
the management device according to claim 3; and
a measurer configured to measure the amount of consumed power from the start time of the object period to the prescribed time point within the object period.

8. A management system comprising:
the management device according to claim 5; and
a measurer configured to measure the amount of consumed power from the start time of the object period to the prescribed time point within the object period.

9. The management device according to claim 1, wherein the operation of the executor is a display according to the target achievement level, and
wherein target achievement levels associated with identical displays in the at least two division periods are different from each other.

10. The management device according to claim 1, wherein a total energy consumption is shown at an end of the object period indicating whether or not the target value is achieved.

11. A non-transitory computer-readable recording medium recording a program causing a computer to function as:
a power acquirer configured to acquire an amount of consumed power by a load from a start time of an object period to a prescribed time point within the object period;
a date acquirer configured to acquire a date of the prescribed time point;
a first storage configured to store a state determination table, the state determination table indicating correspondence relationships in which target achievement levels indicating possibilities of target achievements are respectively associated with combinations with a plurality of division periods and a plurality of ranges of amount of power, the plurality of division periods being obtained by the object period being divided in time series, each division period representing a cumulated energy consumption value from a start of the object period up to an end of the division period, the plurality of ranges of amount of power being obtained by a range of amount of power being divided, the range of amount of power being a range equal to or less than a target value of an amount of power to be consumed in the object period, in each of the plurality of ranges of amount of power, at least two target achievement levels being different from each other, the at least two target achievement levels being respectively associated with combinations with a range of amount of power and at least two division periods of the plurality of division periods;

a second storage configured to store an action table, the action table indicating correspondence relationships with operations for making an executor perform and the target achievement levels;

a first extractor configured to extract, from the state determination table, a target achievement level corresponding to a combination with a division period of the plurality of division periods, which includes the date acquired by the date acquirer and a range of amount of power of the plurality of ranges of amount of power, which includes the amount of consumed power acquired by the power acquirer;

a second extractor configured to extract, from the action table, an operation corresponding to the target achievement level extracted by the first extractor;

an execution controller configured to control the executor to perform the operation extracted by the second extractor;

an operation content acquirer configured to acquire a content of at least one of the operations from an input device configured to receive an input of the content of the at least one of the operations; and an operation content changer configured to change the at least one of the operations in the action table, stored by the second storage, to the content acquired by the operation content acquirer.

12. The non-transitory computer-readable recording medium according claim 11, wherein a total energy consumption is shown at an end of the object period indicating whether or not the target value is achieved.

13. A management method for performing a predetermined performing content according to a target achievement level of amount of consumed power during each of a plurality of division periods into which an object period is divided in time series to a target value of the amount of consumed power of the object period, each division period representing a cumulated energy consumption value from a start of the object period up to an end of the division period, the management method comprising:

acquiring an amount of consumed power by a load from a start time of the object period to a prescribed time point within the object period;

acquiring a date of the prescribed time point;

determining an operation for an executor based on the target achievement level corresponding to a division period including the date that is acquired;

controlling the executor;

acquiring, by an operation content acquirer, a content of at least one of the operations from an input device configured to receive an input of the content of the at least one of the operations; and changing the at least one of the operations in an action table, stored by a second storage, to the content acquired by the operation content acquirer, wherein at least two target achievement levels are different from each other, the at least two target achievement levels being respectively associated with combinations with a range of amount of power and at least two division periods of the plurality of division periods.

14. The management method according to claim 13, wherein the operation of the executor is a display according to the target achievement level, and wherein target achievement levels associated with identical displays in the at least two division periods are different from each other.

15. The management method according to claim 13, wherein a total energy consumption is shown at an end of the object period indicating whether or not the target value is achieved.

* * * * *